Figure 1:
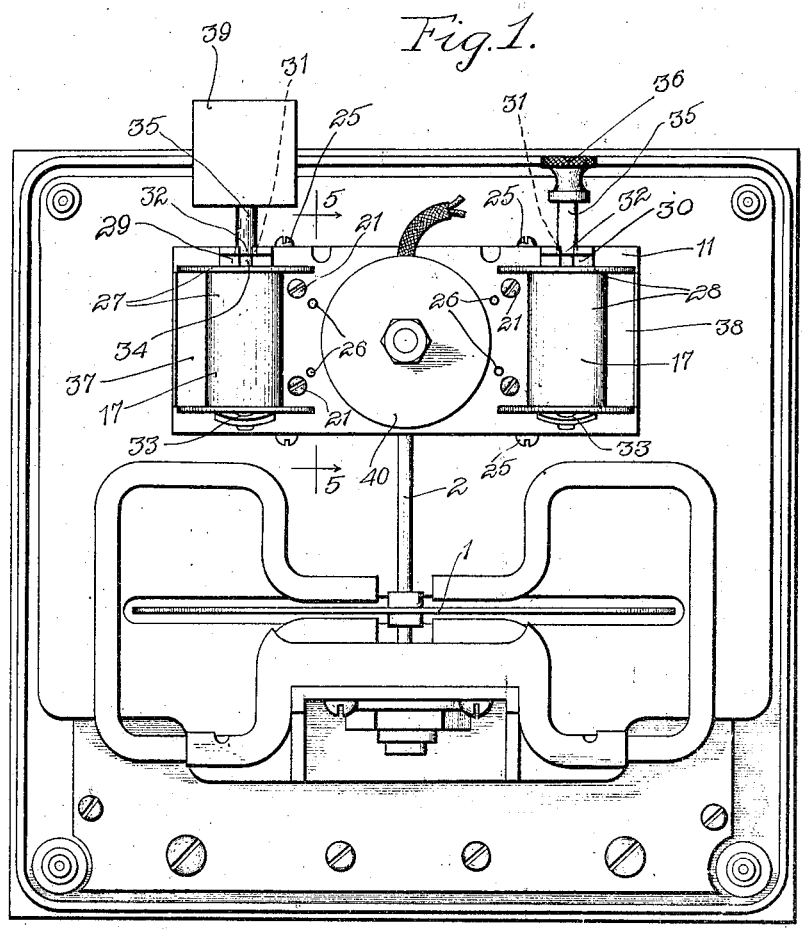

E. SCHILDHAUER.
MEASURING INSTRUMENT.
APPLICATION FILED DEC. 3, 1906.

907,894.

Patented Dec. 29, 1908.

3 SHEETS—SHEET 1.

Witnesses:
Arthur H. Boettcher,
George E. Higham.

Inventor
Edward Schildhauer
By Charles A. Brown
Attorney.

E. SCHILDHAUER.
MEASURING INSTRUMENT.
APPLICATION FILED DEC. 3, 1906.

907,894.

Patented Dec. 29, 1908.

3 SHEETS—SHEET 2.

Witnesses:
Arthur H. Boettcher
George E. Higham

Inventor
Edward Schildhauer
By Charles A. Brown
Attorney

E. SCHILDHAUER.
MEASURING INSTRUMENT.
APPLICATION FILED DEC. 3, 1906.
907,894.
Patented Dec. 29, 1908.
3 SHEETS—SHEET 3.
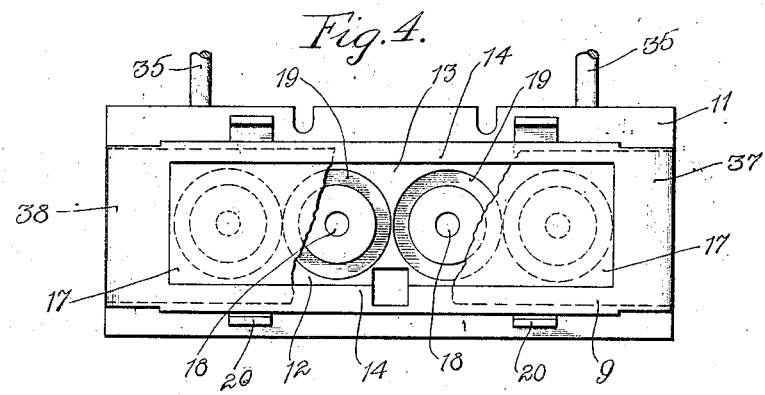
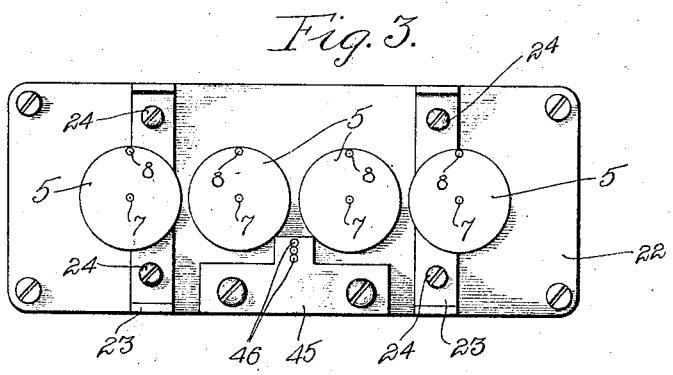
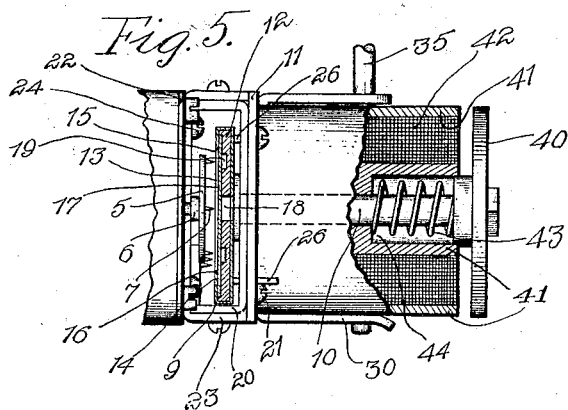
Witnesses:
Arthur H. Boettcher
George E. Higham.
Inventor
Edward Schildhauer
By Charles A. Brown
Attorney

UNITED STATES PATENT OFFICE.

EDWARD SCHILDHAUER, OF WASHINGTON, DISTRICT OF COLUMBIA.

MEASURING INSTRUMENT.

No. 907,894.    Specification of Letters Patent.    Patented Dec. 29, 1908.

Application filed December 3, 1906. Serial No. 346,031.

*To all whom it may concern:*

Be it known that I, EDWARD SCHILDHAUER, a citizen of the United States, residing at Washington, District of Columbia, have invented a certain new and useful Improvement in Measuring Instruments, of which the following is a full, clear, concise, and exact description, reference being had to the accompanying drawings, forming a part of this specification.

My invention relates to measuring instruments, particularly to that class of instruments in which a movable or measuring element is connected in driving relation with pointers traveling over dials, gas meters and electric wattmeters being two well known examples of this class of instruments.

Readings on instruments of this kind are usually taken visually, the reader noting the positions of the various pointers and so ascertaining the indication. Meter readers are also sometimes provided with books in which are fac-similes of the dials, and the reader draws on the fac-simile dials the positions of the various needles on the instrument dials. When indications are taken in this manner, there is more or less chance for error resulting from wrongful or careless reading or noting of the indication.

The main object of my invention, therefore, is to provide means by means of which the exact positions of the needles on the dials may be placed directly on a record sheet or paper, thus insuring the obtaining of accurate readings.

My invention is in the form of an attachment which comprises a frame or pad for holding the material for receiving the record, which pad is adapted to be moved toward or away from the dials of the instrument with which the attachment is connected.

The pointers may be slightly modified in construction so that when the pad with the required material is brought against them, their exact position will be indicated on the record material.

It is some times very desirable to obtain readings simultaneously from a plurality of instruments, as when tests are being made. Heretofore, it has been accomplished by having one person for each instrument, each person upon a given signal reading the instruments, but there is more or less uncertainty as to whether the readings were actually simultaneous and correct readings. By means of my invention, a recording attachment may be provided for each instrument, the movable pads connected together electrically or mechanically and their operation controlled by some master means, either mechanical or electrical, and in this way it is possible to obtain absolutely simultaneous readings of any number of instruments.

In the accompanying drawings I have shown one form of attachment which illustrates the object of my invention.

Figure 2:
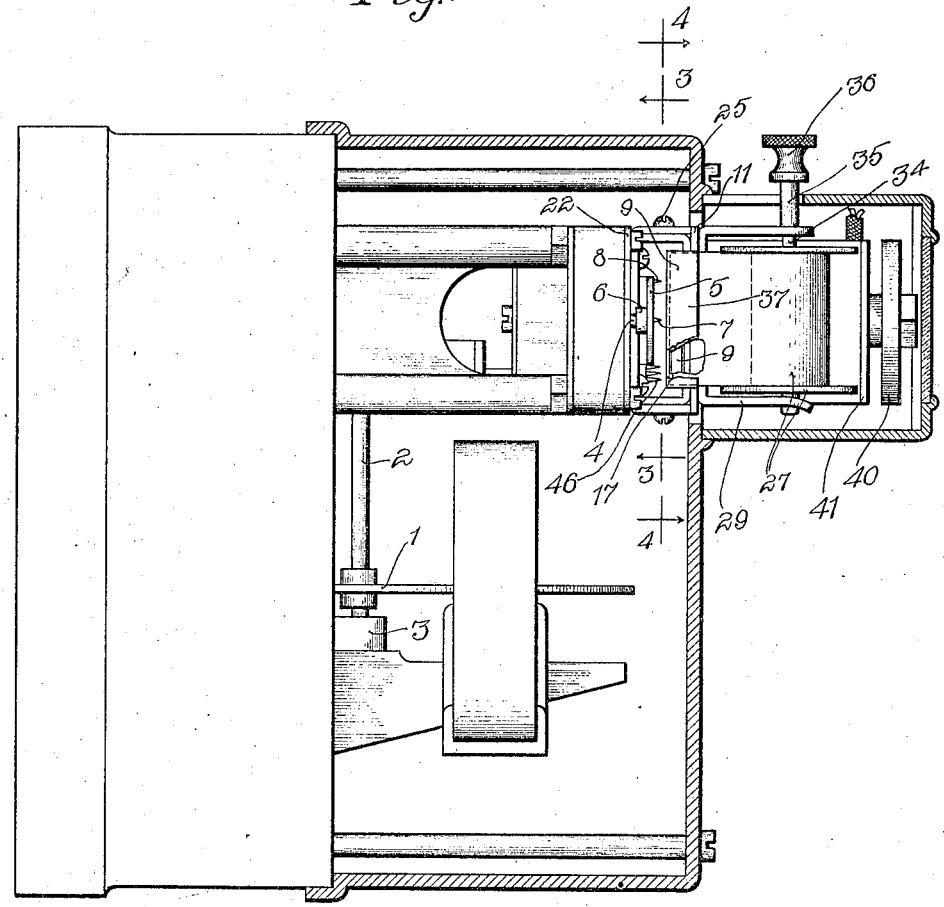

In these drawings—Figure 1 is a front view of a meter with my attachment in place, the front inclosing casing of the meter being removed; Fig. 2 is a side view of the meter shown in Fig. 1, the front inclosing casing being in place but broken away to show the interior parts; Fig. 3 is a sectional view taken on line 3—3 of Fig. 2; Fig. 4 is a sectional view taken on line 4—4 of Fig. 2, and Fig. 5 is a sectional view taken on line 5—5 of Fig. 1.

The instrument here shown is an electric wattmeter. The measuring element or meter disk 1 is mounted on the spindle 2 which may be suitably journaled in the lower bearing 3 and any form of upper bearing (not shown). The spindle may be connected in any well known manner through gear trains with any number of dial shafts 4, four of such dial shafts being shown in this instrument. In the ordinary meter these dial shafts terminate in pointers, and concentric with these pointers are indicating scales painted or printed on a dial plate. If my record attachment, however, is used in connection with the instrument, the dial plate and pointers are removed and a disk 5 is secured to the end of each of the shafts 4. Each disk has a hub 6 adapted for screw-threaded or other engagement with the end of the corresponding shaft 4, and extending forwardly from the disk at its center is a point or pin 7, while near the edge of each disk is a second point or pin 8, the apices of all the pins lying in the same plane. As the measuring element 1 rotates, the various disks will rotate, each of the outer pins 8 traveling in a circular path, and if a strip of paper is at any time pressed simultaneously against all the points, it will receive perforations consisting of a horizontal row of perforations corresponding to the center pins of the disks and four other perforations situated in various positions about the center perforations. If a transparent strip of paper having dials painted thereon be placed over the perforated strip with the centers of the dials coinciding with the center perforations, the other perforations will indicate on the dial the reading of the instrument at the time the impressions were made. This would be a simple way of obtaining direct and accurate readings. I prefer, however, to provide more practical means for adapting the record paper to be moved to receive an imprint of the readings. I, therefore, provide a rectangular frame or shell 9 supported at its center at the end of a rod 10 which rod passes through and is supported by a frame or plate 11. In this frame is the plate or pad 12, and in the front wall of the frame 9 is cut the opening 13, leaving a rim 14 for holding the pad 12 in place. The thickness of the pad 12 along its front and lower edges is equal to the depth of the frame 9, but the remainder of the pad is thinner, so as to form upper and lower retaining slots 15 and 16 into which a record paper strip 17 may be inserted, the ends of the frame 9 being open for this purpose. The pad 12 may be of soft material to receive the points 7 and 8, or, as shown, may be of hard substance, such as metal, with a row of central grooves or holes 18 placed in line with the center pins 7 and with annular grooves 19 concentric with the center pins and opposite the outer pins 8, the record paper being disposed in the frame 9 and against the face of the pad over the grooves 18 and 19. The pins will pass through the record paper and into these grooves when the rod 10 is moved inwardly to carry the pad frame toward the disks, and when the pad frame is again pulled away, the record paper may be withdrawn from the pad frame and will have perforations which exactly indicate the position of the indicating pins when the impression was taken.

The frame 11 is provided with the U-shaped pieces 20 secured thereto by screws 21, and the front plate 22 of the gearing housing of the meter has secured thereto the U-shaped pieces 23 by means of screws 24, said U-shaped pieces being disposed to pass over and to receive the limbs of the U-shaped pieces 20 of the attachment, and when in such position the engaging U-shaped pieces may be secured together by screws 25 passing through the upper limbs thereof, and thus the recording attachment is held rigidly to the gearing housing with the pad frame opposite the point disks. Guide pins 26 extend from the pad frame and pass through the frame 11 to prevent displacement or rotation of the pad frame. Instead of inserting a piece of record paper, a long strip of record paper may be inserted in the pad frame and fed therethrough for each impression, and to receive the ends of the record strip, drums 27 and 28 may be provided, as best shown in Figs. 1 and 2, one at each end of the plate 11. For supporting the drums, U-shaped frames 29 and 30 are provided, each frame having in its upper limb a circular bearing hole 31 and a slot 32 leading thereto from the edge of the limb, said slot being slightly narrower than the diameter of the bearing hole. The lower limb of each U-shaped frame has the bearing hole 33, and the end of this lower limb is slightly bent downwardly, as shown. The lower parts 34 of the shafts of the drums have a diameter equal to the diameter of the lower bearing holes 33 and the width of the slots 32, while the upper parts 35 of the shafts have a diameter equal to the diameter of the upper bearing holes 31, the arrangement being such that when a drum is inserted in a U-shaped frame, the lower end of the drum shaft may be inserted in the lower bearing hole 33, and the upper end of the shaft part 34 slid through the slot 32 and into the upper bearing hole 31 whereupon the drum is dropped to rest on the lower limb of the U-shaped frame and the thicker part 35 of the drum shaft will enter the bearing hole 31, and each drum will thus be locked in its U-frame. Either drum may act as the intake drum to receive the paper after its passage through the pad frame from the supply drum. The upper ends of the drum shafts may be provided with knurled thumb heads 36 whereby the intake drum may be readily turned to advance the record paper after each actuation of the pad frame to take a reading. The ends 37, 38 of the front wall of the pad frame may be curved toward the drums, as shown in Figs. 1 and 4, to assist in guiding the record paper. If a reading is desired at certain intervals or times, one of the drum shafts may also be connected with time clock mechanism 39 of any construction and so arranged that at the required time it will cause rotation of the drum to advance the paper for each operation of the pad frame to receive a reading.

It is often very desirable, particularly in making tests, to obtain simultaneously the readings of a great number of instruments, and with my attachment this can be readily accomplished by connecting together all the pad supporting and actuating rods 10, either mechanically or electrically. If they are connected together mechanically, a single actuation will cause simultaneous movement of the pad frames to simultaneously receive readings from the various instruments. I have, however, shown electrical means for accomplishing such simultaneous actuation of any number of pad frames. At the end of the rod 10 is secured an armature disk 40 disposed opposite the electromagnet frame 41 supporting the energizing winding 42, current flowing through this winding causing magnetizing of the frame and attraction of the armature disk 40 thereto, the result being movement of the pad frame against the indicating pins 7 and 8. To release the armature after cessation of current flow, spring 43 is provided encircling the rod and bearing against the armature 40 and the end wall of the pocket 44. The electromagnets of the various instruments may be connected in any manner with a main current supply circuit which is controlled by a master manual or automatic means, such as an ordinary electric switch or time clock controlled switch, and upon operation of such master means the various electromagnets are simultaneously actuated and the record pads moved simultaneously to receive the records from the instruments. After each actuation of the electromagnets, the record paper in each pad frame may be shifted manually, or automatically shifted when the automatic time mechanism 39 is employed on the drum shafts.

To identify the various records on the record sheet, that is, to show by which instrument any particular record is made, there is provided for each instrument some means for printing or indicating on the record sheet the number or other character representing the instrument when the pad frame is moved to receive the record. I have shown the plate 45 secured to the front wall 22 of the gearing train casing, and from this plate extends a number of pins or points 46, the number of points preferably indicating the number of the meter. Meter No. 1 will have one of the points 46; meter No. 2 will have two points and so on, or these points may be arranged to form different characters to identify the meters.

When the record strip is removed from the pad frame, the readings thereon may be ascertained by placing over the impressions a plate of glass or other transparent material on which are painted or printed the dials whose centers register with those of the point disks on the meter.

I do not wish to be limited to the particular class of meter or the particular construction and arrangement of my attachment here shown, as my invention is applicable to any instrument in which a movable element is connected with indicating or registering dial pointers. The particular arrangement is one of many which could be employed to carry out my invention.

What I claim as new and desire to secure by Letters Patent is:

1. In a measuring instrument, the combination of driving mechanism, indicating mechanism, rotatable disks for the indicating mechanism, a plurality of points for extending from each disk and disposed in a radial line, the ends of the points being all in a common plane, a guide frame supported from the instrument structure, a pad frame adapted for reciprocation within the guide frame, a pad supported in the pad frame, mechanism for feeding record paper through the pad frame in front of the pad, an electromagnet supported from the guide frame and having a movable armature connected with the pad frame, energization of the electromagnet causing movement of the armature to carry the pad frame toward the points to cause the record paper to be punctured by the points to thereby receive markings indicative of the meter reading.

2. In a measuring instrument, the combination of driving mechanism, indicating mechanism, rotating shafts connecting the driving mechanism with the indicating mechanism, points for said indicating mechanism arranged in a common plane, a guide frame supported from the instrument, a pad frame adapted for reciprocation in said guide-frame toward and from said points, an actuating rod extending forwardly from the pad frame whereby said frame may be reciprocated, an armature at the end of said rod, and an energizing winding supported from the guide-frame adapted to operate the armature to cause movement of the pad to receive an impression from said points.

3. In a measuring instrument, the combination of driving mechanism, indicating mechanism connected with the driving mechanism, indicating points connected with the indicating mechanism and arranged in a common plane, a guide-frame supported from the instrument structure, a pad frame adapted for reciprocation within the guide-frame toward and from said points, an electromagnetic mechanism mounted on the guide-frame and associated with the pad frame to cause movement thereof toward the points to receive an impression therefrom indicative of the instrument reading.

In witness whereof, I hereunto subscribe my name this 27th day of November A. D., 1906.

EDW. SCHILDHAUER.

Witnesses:
E. McC. JONES,
WM. M. BEALL.